US006955292B2

(12) United States Patent
Nakamura et al.

(10) Patent No.: US 6,955,292 B2
(45) Date of Patent: Oct. 18, 2005

(54) MEDIA READER FOR A REMOVABLE DIGITAL STORAGE MEDIUM

(75) Inventors: Fumiharu Nakamura, Irvine, CA (US); Yoshifumi Ishikawa, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 10/188,423

(22) Filed: Jul. 2, 2002

(65) Prior Publication Data

US 2004/0004121 A1 Jan. 8, 2004

(51) Int. Cl.[7] .............................................. G06F 17/00
(52) U.S. Cl. ....................... 235/375; 235/380; 235/441; 235/492
(58) Field of Search ................................ 235/375, 379, 235/380, 382, 441, 486, 487, 492, 493, 381, 385; 705/65; 345/156; 360/133

(56) References Cited

U.S. PATENT DOCUMENTS

| | | | |
|---|---|---|---|
| 4,677,661 A | 6/1987 | Gilluwe et al. | 379/159 |
| 5,068,889 A | 11/1991 | Yamashita | 379/62 |
| 5,159,182 A * | 10/1992 | Eisele | 235/492 |
| 5,406,064 A * | 4/1995 | Takahashi | 235/492 |
| 5,457,590 A * | 10/1995 | Barrett et al. | 360/133 |
| 5,537,626 A | 7/1996 | Kraslavsky et al. | 710/8 |
| 5,541,985 A * | 7/1996 | Ishii et al. | 379/111 |
| 5,717,957 A | 2/1998 | Lin | 710/72 |
| 5,971,273 A * | 10/1999 | Vallaire | 235/381 |
| 6,000,607 A | 12/1999 | Ohki et al. | 235/379 |
| 6,089,459 A * | 7/2000 | Eisele et al. | 235/492 |
| 6,107,988 A * | 8/2000 | Phillipps | 345/156 |
| 6,168,077 B1 | 1/2001 | Gray et al. | 235/375 |
| 6,175,517 B1 * | 1/2001 | Jigour et al. | 365/63 |
| 6,256,059 B1 | 7/2001 | Fichtner | 348/207 |
| 6,257,486 B1 * | 7/2001 | Teicher et al. | 235/380 |
| 6,298,441 B1 * | 10/2001 | Handelman et al. | 713/185 |
| 6,325,291 B1 * | 12/2001 | Eisele et al. | 235/487 |
| 6,360,362 B1 | 3/2002 | Fichtner | 717/11 |
| 6,381,513 B1 * | 4/2002 | Takase et al. | 700/231 |
| 6,405,049 B2 * | 6/2002 | Herrod et al. | 455/517 |

FOREIGN PATENT DOCUMENTS

JP    2001-117783    4/2001

* cited by examiner

Primary Examiner—Thien M. Le
Assistant Examiner—Edwyn Labaze
(74) Attorney, Agent, or Firm—Fitzpatrick, Cella, Harper & Scinto

(57) ABSTRACT

A media reader for a removable digital storage medium, such as a memory stick for a digital camera, has a housing and a media reading unit, contained within the housing, into which the removable digital storage medium is inserted for reading data. The media reader also includes a manual manipulation unit for selecting a predetermined function to be communicated to a peripheral device, where the manipulation unit has different size buttons corresponding to each predetermined function, wherein the size of each button varies based on a frequency of use of the function. A signal indicative of the selected predetermined function is communicated by a controller to the peripheral device, which causes an application program in the peripheral device to be automatically commenced to perform the selected predetermined function, the application program in the peripheral device performing the selected predetermined function, including obtaining data from the removable digital storage medium.

18 Claims, 6 Drawing Sheets

MEDIA READER FOR A REMOVABLE DIGITAL STORAGE MEDIUM

BACKGROUND OF THE INVENTION

1. Field of the Invention

The present invention relates to a media reader for removable digital storage media, such as memory cards for digital cameras. More specifically, the present invention concerns a structure for a media reader having a media reading unit, a communication interface, a manual manipulation unit, and a controller arranged within a housing such that the structure provides for ease of manipulation and operation, while at the same time reducing the overall size of the media reader.

2. Description of the Related Art

Digital photography has become popular in recent times and as a result, the use of digital cameras to record images has become increasingly prevalent. Many digital cameras utilize a removable storage medium, such as a flash card or a memory stick, to store the recorded images. When the memory capacity of the storage medium has been fully utilized, the user generally transfers the digital images to another medium. For instance, the user may want to upload the images stored on the camera's storage medium to a hard-drive on a personal computer or to some other type of medium such as a CD-ROM. Moreover, the user may want to print hardcopy printouts of the recorded images utilizing, for example, a photo quality printer. Various techniques for accomplishing each of the foregoing have been known.

By way of example, it has been known to upload images from a digital camera to a personal computer by, for example, connecting the digital camera directly to the personal computer utilizing, for example, a Universal Serial Bus (USB) cable. With this arrangement, when the camera is connected to the personal computer, operating system software in the personal computer generally recognizes the camera as a generic "Removable Drive". To upload the images, the user can click on an icon for the "Removable Drive" and scan through various directories and folders until file icons for each of the stored images appear. The user can then either upload selected image files or all of the image files to the personal computer by performing a common "cut and paste" operation.

While the foregoing process achieves the desired result, it is, of course, not without its drawbacks. One such drawback is that, while the camera is being utilized to upload the stored images, the camera is unavailable for the user to take additional photos. Another drawback is that it requires rather significant manual operation by the user to complete the upload process. That is, the user has to perform several operations such as clicking on a "My Computer" icon, clicking on a "Removable Drive" icon, clicking on a "Still Images" icon, selecting the still images to be uploaded or clicking on a "Select All" icon, clicking on a "Cut" or "Copy" icon, scanning through the directories on the personal computer to find the directory into which the digital images are to be uploaded to, clicking on the selected directory or folder, and finally, clicking on a "Paste" icon, in order for the digital images to be uploaded.

Another example is a printer that includes one or more slots for inserting the removable storage medium. In somewhat more detail, some photo quality printers include slots for inserting the removable storage medium from the digital camera directly into the printer. Once the storage medium is inserted into the printer, the user can perform an operation at the printer to printout hardcopies of the images on the printer. While this type of printer provides added capabilities for users to be able to print out digital images without the need for a personal computer, the user nonetheless has to navigate through a series of steps on a display of the printer. Moreover, the user's ability to utilize the printer's direct medium reading capabilities, the user must utilize a digital camera that has the same type of storage medium for which the printer is designed to accommodate. That is, most printers that include a slots for inserting storage medium can only accept one or two particular types of storage medium. As a result, in order to utilize the printer's capabilities, the user must have a digital camera that is compatible with the printer. Thus, if the user purchases a digital camera that is incompatible with the printer, they would need to bear the expense of a new printer in order to utilize the printer's direct reading capabilities.

One technique to address the foregoing has been proposed in co-pending U.S. patent application Ser. No. 09/895,186 (hereinafter referred to as the "'186 application) entitled "Printer-Based Interface With Removable Digital Storage Media", filed on Jul. 2, 2001. In the '186 application, a basic architecture and associated software components are described whereby, when a storage medium from a digital camera is installed in a reader and a user presses a button on the reader to perform, for example, a printing operation, software corresponding to the printing operation in a personal computer connected to the reader is automatically launched. The software then performs various operations such as retrieving image files stored on the storage medium and prints the images on a printer connected to the personal computer. Thus, the user can have digital images uploaded and/or printed without having to connect the digital camera to the personal computer, and without having to navigate numerous process steps to complete the process. While the '186 application defines a basic architecture and functionality of a media reader, the present invention expands on the '186 application's invention by providing a more optimum structure for a media reader.

SUMMARY OF THE INVENTION

The present invention provides a structure for a media reader that is compact and easy to manipulate. According to the invention, a media reader comprises a media reading unit, a communication interface, a manual manipulation unit, and a controller, which may all be incorporated into an integrated circuit card. The manual manipulation unit, which may include a plurality of buttons, is located between a connector for the media reading unit, which may be located nearest one end of the housing into which a digital storage medium may be inserted, and an opposing end of the housing. For example, the buttons may be arranged vertically along one direction of the housing so that a user can easily manipulate any one of the plurality of buttons utilizing one hand. Such an arrangement reduces the overall size of the media reader and provides for easy manipulation.

Thus, in one aspect the invention is a media reader for a removable digital storage medium, comprising a housing having at least a proximal end portion and a distal end portion, a media reading unit, contained within the housing, into which the removable digital storage medium is inserted for reading data contained thereon, the media reading unit having at least a proximal end adjacent the proximal end of the housing and a distal end opposite the proximal end of the media reading unit, the distal end having a connector for electrically connecting the media reading unit and the removable digital storage medium, a communication interface that provides communication between the media reader and a peripheral device, a manual manipulation unit for selecting a predetermined function to be communicated to the peripheral device via the communication interface, the manual manipulation unit being arranged within the housing between the connector of the media reading unit and the distal end portion of the housing, and a controller communicating with the connector of the media reading unit, the manual manipulation unit, and the peripheral device via the communication interface, the controller detecting connection of the removable digital storage medium to the connector of the media reading unit, detecting selection of a predetermined function from the manual manipulation unit, and communicating a signal indicative of the selected predetermined function to the peripheral device via the communication interface.

In other aspects, the media reading unit, the communication interface, the manual manipulation unit and the controller may be part of an integrated circuit board installed in the housing and the manual manipulation unit may comprise a plurality of buttons each corresponding to a different predetermined function. In this latter aspect, the housing may further comprise a top portion, wherein each of the plurality of buttons are accessible through a corresponding hole through the top portion of the housing, and wherein the buttons are recessed below an outer surface of the top portion of the housing. Providing recessed buttons provides a way to reduce the possibility of inadvertent actuation of a button when, for example, the media reader is turned upside down.

Moreover, the plurality of buttons may be sequentially arranged in a direction extending from the proximal end of the housing to the distal end of the housing, or alternatively, the plurality of buttons may be sequentially arranged in a direction transverse to a direction extending from the proximal end of the housing to the distal end of the housing. Such arrangement of the buttons provides for ease of use of the buttons by aligning the buttons in such a manner that provides for ease of selection, while at the same time, reducing the overall profile (size) of the media reader.

The invention also provides for the plurality of buttons to have different sizes based on frequency of use of the predetermined function corresponding to the respective button, and for the media reading unit to be capable of reading a plurality of different types of removable digital storage media. To assist users in their ability to select a particular operation, a larger size button may be provided for an operation that is utilized more frequently than others, such as a print operation. Providing the ability to read different types of storage media provides additional advantages by reducing the need to have a media reader specific to each particular type of recording medium that may be commercially available.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
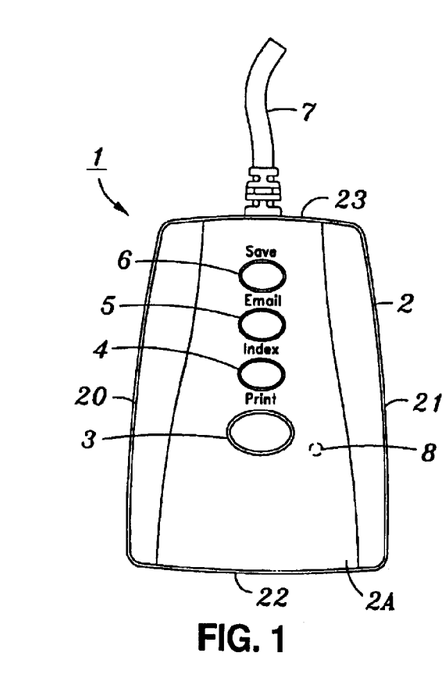
FIG. 1 depicts an outward appearance (top view) of a preferred embodiment for a media reader according to the invention.
Figure 2:
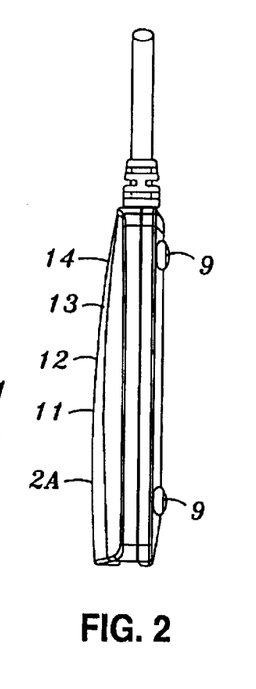
FIG. 2 depicts an outward appearance (side view) of a preferred embodiment for a media reader according to the invention.
Figure 3:
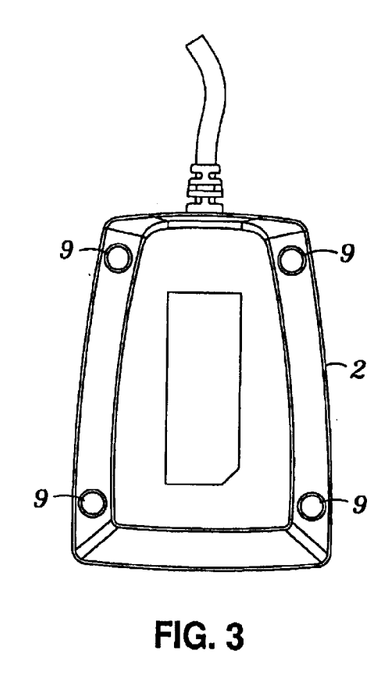
FIG. 3 depicts an outward appearance (bottom view) of a preferred embodiment for a media reader according to the invention.
Figure 4:
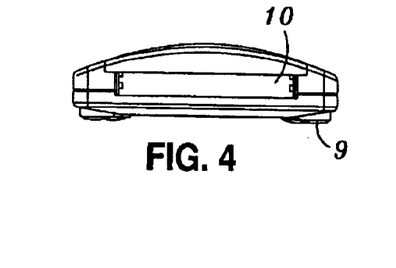
FIG. 4 depicts an outward appearance (front view) of a preferred embodiment for a media reader according to the invention.

FIGS. 1 to 4 depict outward appearances of a preferred embodiment of a media reader according to the invention, where FIG. 1 is a top view, FIG. 2 is a side view, FIG. 3 is a bottom view and FIG. 4 is a front view. As seen in FIG. 1, a media reader 1 is contained within a housing 2 and may include buttons 3, 4, 5 and 6. Housing 2 is preferably made of a molded plastic and is preferably made of two separate molded portions that can either be fit together with, for example, an engaging mechanism such as a latch, are held together with one or more fasteners, or any combination of the two. Of course, housing 2 could also be made from other materials such as machined or cast metals or polymers, but for least expense in manufacture, a molded plastic is preferred. Each of buttons 3 to 6 shown in FIG. 1 preferably correspond to a preset function that can be initiated by depressing one of the buttons. For example, button 3 may correspond to a "Print" function, button 4 may correspond to an "Index" function, button 5 may correspond to an "Email" function, and button 6 may correspond to a "Save" function. Each of the foregoing functions and how they are initiated will be described in more detail below. Media reader 1 may also include an LED (Light Emitting Diode) 8 that emits light to, for example, indicate that the media reader is powered on, that one of the function buttons has been depressed, etc. That is, LED 8 may remain on constantly to indicate that the media reader is powered on, and when one of the buttons is depressed, may flash on and off at a constant rate to indicate activation of one of the functions.

Media reader 1 also includes a bi-directional communication/power cable 7 that transmits and receives data, commands, electrical power, and other signals to/from a peripheral device to which cable 7 is connected. Cable 7 is preferably a Universal Serial Bus (USB) cable, but may be any other type of communication/power cable instead, such as a serial cable. Alternatively, rather than a cable, media reader 1 may include a radio transmitting device (not shown) that is utilized to transmit/receive data, commands, etc. to/from a peripheral device. As one example of a radio transmitting device, an infrared light emitting diode may be utilized.

In FIGS. 2 and 3, media reader 1 is seen to include supports 9 on the lower (bottom) portion of housing 2. Supports 9 provide a stable structure for maneuvering media reader 1 about a table top or desktop surface. Supports 9 are preferably spaced outside of an area bounding buttons 3 to 6. That is, transposing supports 9 of FIG. 3 onto FIG. 1, the supports are spaced in such a manner that each of buttons 3 to 6 are contained within a region defined by drawing an imaginary line connecting each of the supports. The spacing and location of supports 9 provide stability by reacting to pressure applied to any one of buttons 3 to 6 when the button is depressed. That is, the supports are spaced such that the media reader won't tilt or rock about a line connecting any two of the supports when one of the buttons is depressed. While four circular or cylindrical shaped supports are shown, other types may be used instead, such as two elongated supports on opposing sides of the bottom face. Regardless of the shape of support used, so long as they prevent tilting of the media reader when one of the buttons is depressed, they meet the desired functionality.

Referring now to FIG. 4, media reader 1 also includes a media insertion slot 10 contained in housing 2. Slot 10 in housing 2 provides access to a media reader connector which, as will be described in more detail below, is preferably contained on an integrated circuit card within housing 2. A user can insert a removable digital storage medium, such as a compact flash card, a memory stick, etc. into slot 10 to engage the connector on the circuit card. Slot 10 is preferably sized so as to allow insertion of at least different types of storage media, one on top of the other as viewed from the front view of FIG. 4. In addition, slot 10 is preferably located opposite cable 7 in media reader 1, but cable 7 could also be located in other positions relative to slot 10.

Referring again to FIG. 1, the size of each of buttons 3 to 6 preferably varies based on the corresponding function and/or the location of the button on the media reader. In FIG. 1, button 3 corresponding to a "Print" function is shown larger in size than buttons 4 to 6. In this regard, a print operation is expected to be the function most commonly utilized by users of the media reader. As such, to assist users in easier selection of button 3 (the "Print" function), the button is preferably made larger in size in comparison to the other buttons so that the user is more readily able to detect the button by feeling for the larger size. In like manner, the buttons may alternatively include some type of distinguishing marks or texture that helps the user identify one button from another, or each of the buttons may have different shapes to distinguish them from each other. For instance, one or more buttons may be oval or circular shaped, with others being triangular, diamond, cubic shaped, etc. It should be noted that, while buttons have been described as a preferred embodiment, other arrangements for manually manipulating the media reader, such as a touch panel display, switches, etc. may be used instead.

The buttons may be arranged sequentially in a particular direction on the media reader so as to assist a user in selecting a button corresponding to a particular function. For example as shown in FIG. 1, buttons 3 to 6 are sequentially arranged vertically in a direction extending from a side of the media reader closest the media insertion slot 10 (side 22) to a side of the media reader containing the USB cable 7. In this regard, the media reader is preferably sized so as to be easily manipulated by a user's hand, where a right-handed user would manipulate the media reader with, for example, a thumb engaging a side 20 of the media reader, a pinky finger engaging a side 21 of the media reader, and a portion of the hand near the user's wrist engaging the side 22. To manipulate any one of buttons 3 to 6, the user can merely utilize their index finger by maneuvering the finger in a vertical direction to depress a button of their choosing. Thus, by providing varying sizes of buttons, indicia marks or texture on the buttons, and by arranging the buttons in a particular manner on the media reader, the media reader is easily manipulated by a user.

A further feature of the media reader is depicted in FIG. 2. In FIG. 2, reference numbers 11 to 14 depict recesses in a top surface 2A of housing 2, where the recesses surround each of the buttons, respectively. The recesses around the buttons provide for each of buttons 3 to 6 to be slightly recessed below the top surface 2A of housing 2 such that, in the event that a user inadvertently capsizes the media reader so that the top surface 2A is resting on a table top or desktop surface, the buttons 3 to 6 are protected from inadvertent depression. That is, if the user accidentally turns the media reader upside down, the buttons will not be depressed by the surface of the table or desktop to inadvertently activate one of the media reader's functions. As such, the media reader's buttons extend through holes in the housing 2 so that they can be depressed, but do not extend outward of the top surface 2A of the media reader.

As stated above, the media reader 1 is preferably arranged so as to provide easy use with a user's hand. A preferred embodiment of a media reader depicted in FIG. 1 preferably is sized on the order of 4 to 5 inches in length (measured from a side 22 to a side 23), about 2 to 3 inches in width (measured from a side 20 to a side 21), and about 1 inch in height (as seen in FIG. 4). Of course, other sizes could be utilized and the foregoing are merely representative of those that provide for easy one-handed manipulation by a user.

Figure 9:
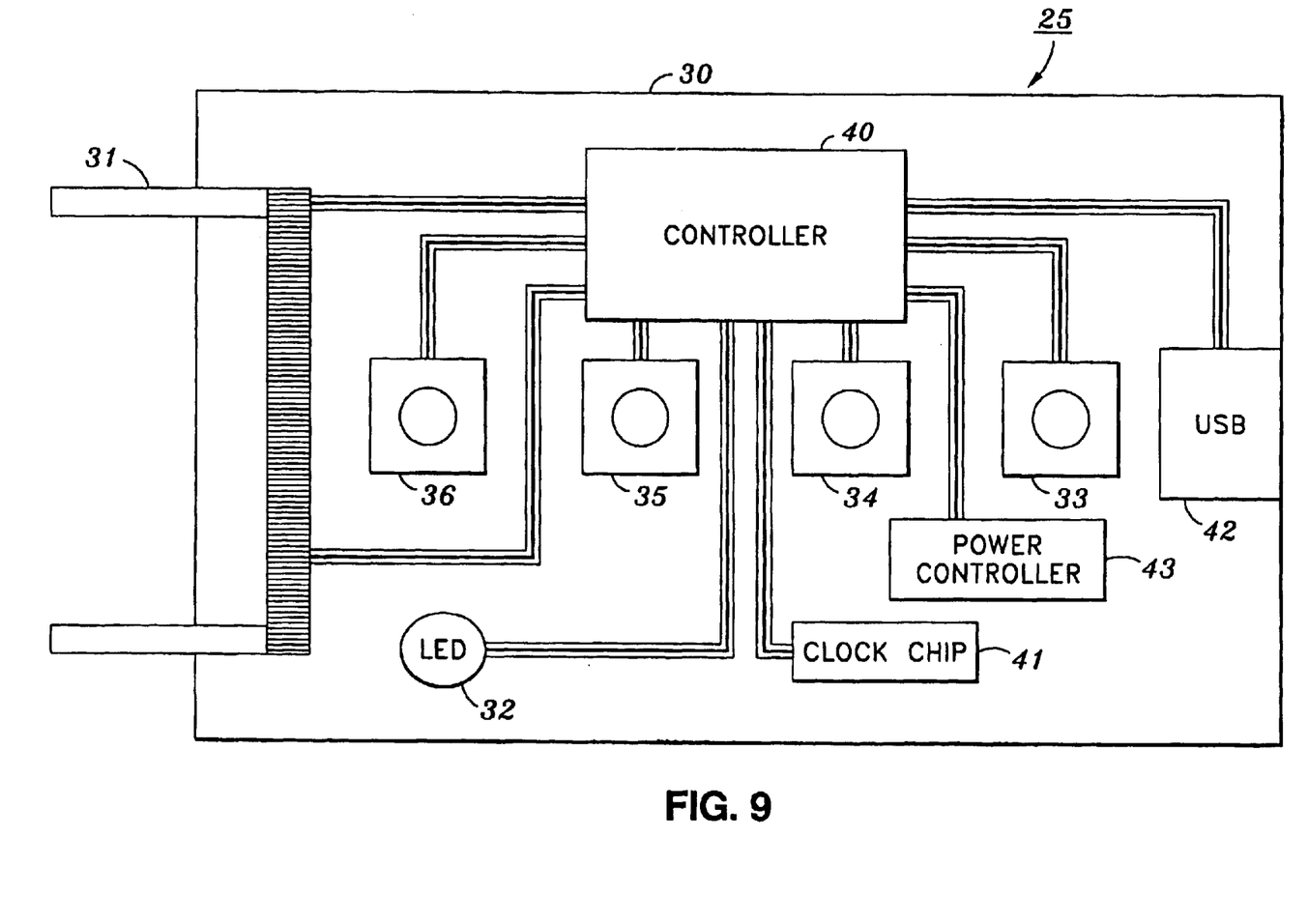
FIG. 9 is a block diagram of an integrated circuit card according to the invention.

FIGS. 5 to 8 depict outward appearances of an integrated circuit card 25 for a media reader according to one embodiment of the invention, and FIG. 9 is a block diagram showing the interconnection of the various components of circuit card 25. Integrated circuit card 25 is preferably contained within housing 2 of media reader 1 and may be retained within the housing utilizing fasteners such as screws, temporarily (i.e., removably) retained between engaging portions of the housing when the housing portions are assembled, or may be permanently mounted in the housing utilizing, for example, an adhesive or by melting an engaging portion of the plastic housing so as to permanently mount the circuit card to the housing.

Figure 5:
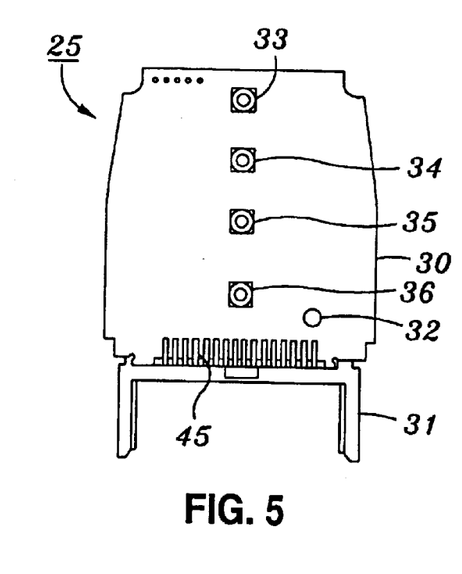
FIG. 5 depicts an outward appearance (top view) of an integrated circuit card for a preferred embodiment of a media reader according to the invention.
Figure 6:
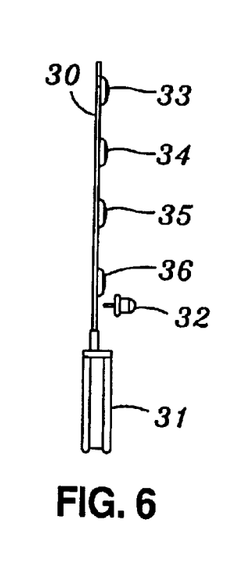
FIG. 6 depicts an outward appearance (side view) of an integrated circuit card for a preferred embodiment of a media reader according to the invention.
Figure 7:
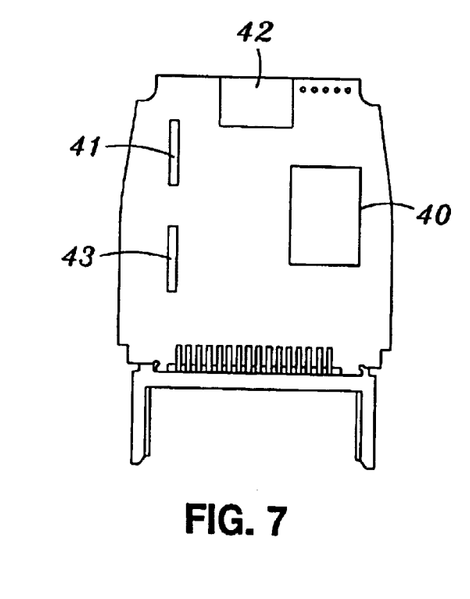
FIG. 7 depicts an outward appearance (bottom view) of an integrated circuit card for a preferred embodiment of a media reader according to the invention.
Figure 8:
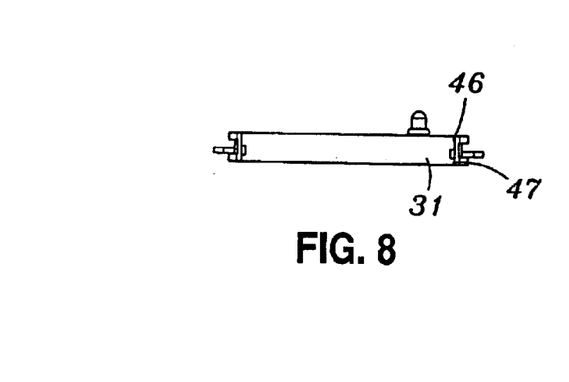
FIG. 8 depicts an outward appearance (front view) of an integrated circuit card for a preferred embodiment of a media reader according to the invention.

As seen in FIG. 5, integrated circuit card 25 is preferably comprised of a circuit board 30, media reader connector 31, LED 32, and switches 33 to 36. In FIG. 5, LED 32 and switches 33 to 36 are integrated to circuit board 30 on the top side of the board. In contrast, integrated onto the bottom side of board 30 is micro-chip controller 40, clock chip 41, bi-directional interface 42, and power controller 43. Each of the foregoing components are integrated onto circuit board 30 utilizing well known techniques for producing integrated circuit cards, thereby providing communication between them.

Media reader connector 31 is preferably a card reader that provides a connection and access to removable digital storage media in the form of PC cards with a PCMCIA interface. Connector 31 preferably includes at least two types of slotted interfaces 46 and 47 for accepting different types of media cards. For instance, one slotted interface 46 on a top portion of the connector may accept compact flash cards, while another slotted interface 47 on a bottom portion of the connector may accept Smart Media, Sony's Memory Stick, IBM Microdrive, etc. The media card is inserted into the slots so that electrical connectors on the media card (not shown) engage electrical connectors (i.e., pins) in media reader connector 31 (shown generally in FIG. 5 as reference number 45). When the media card is inserted into the slot and an electrical connection is established with pins 45, the connection is detected by controller 40. This process will be described in more detail below.

Switches 33 to 36 are preferably mechanical microswitches; any known type of which can be utilized. Switches 33 to 36 are electrically connected to controller 40 via the integrated circuit board and provide a signal to controller 40 when any one of buttons 3 to 6 are depressed. As seen in FIG. 5, switches 33 to 36 are sequentially located on circuit board 30 between media reader 31 and bi-directional interface 42. This configuration of the switches corresponds to the button configuration shown in FIG. 1. Of course, where other types of manual manipulation units are utilized, such as a touch panel display, circuitry and connections for integrating the touch panel display to circuit card 25 are utilized in place of switches. In this regard, any well known touch panel integration circuit could be utilized to practice the invention.

Integrated circuit card 25 also includes LED 32 that emits light at various times based on operation of the media reader, clock chip 41, and power controller 43 that controls power distribution on the integrated circuit card. Bi-directional interface 42 is preferably a USB interface and may include a cable permanently connected to circuit board 30, or interface 42 may be a connector to which a USB cable can be removably connected. Interface 42 provides bi-directional communication/power between circuit card 25 and a peripheral device, such a personal computer or a printer. Interface 42 is preferably located on circuit board 30 opposite card reader 31, but other arrangements could also be utilized.

Micro-chip controller 40 may be any type of known programmable micro-chip. Controller 40 communicates with each of the components integrated to circuit card 25, as well as communicating with a peripheral device, and controls operation of the media reader. More particularly, controller 40 recognizes connection of interface 42 to a peripheral device, recognizes depression of one of buttons 3 to 6 and transmits a signal corresponding thereto to the peripheral device, recognizes insertion and connection of a digital storage medium into connector 31 and controls transfer of data contained thereon to the peripheral device, and controls illumination of LED 32. Thus, the functions of the media reader are controlled by controller 40.

Figure 10:
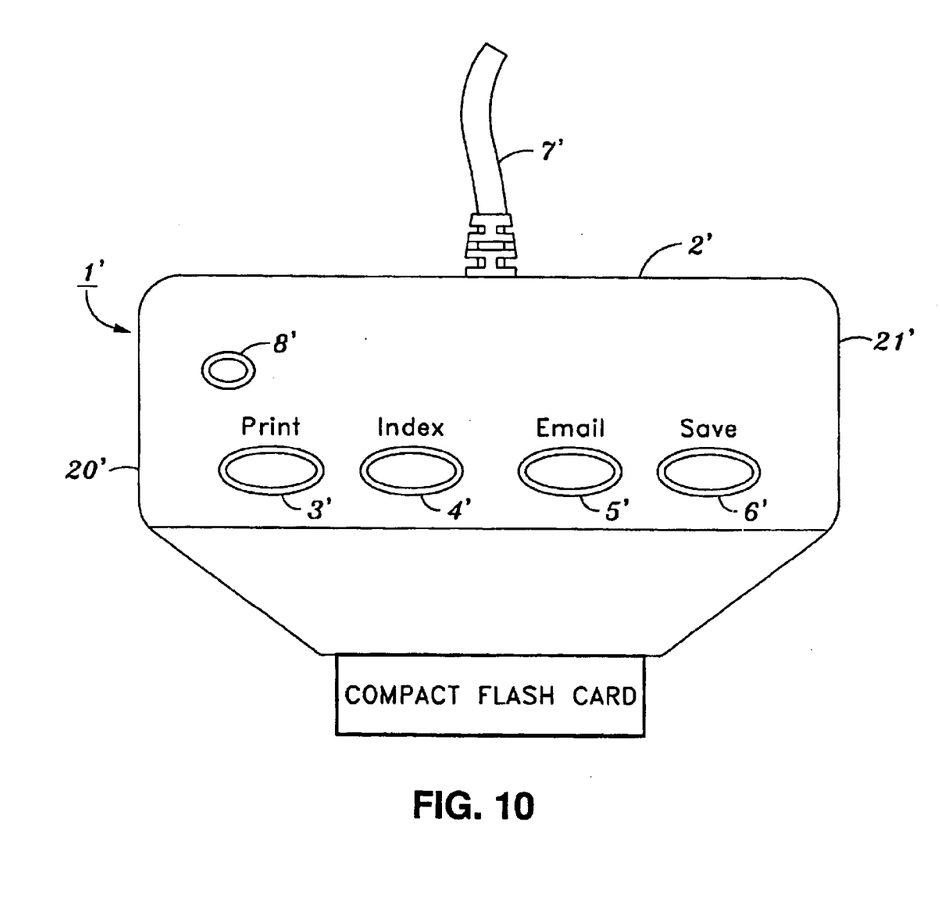
FIG. 10 depicts an outward appearance (top view) for a media reader according to an alternative embodiment of the invention.
Figure 11:
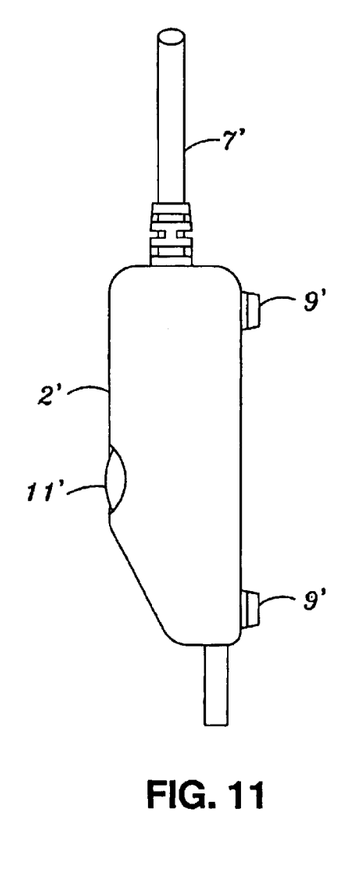
FIG. 11 depicts an outward appearance (side view) for a media reader according to an alternative embodiment of the invention.
Figure 12:
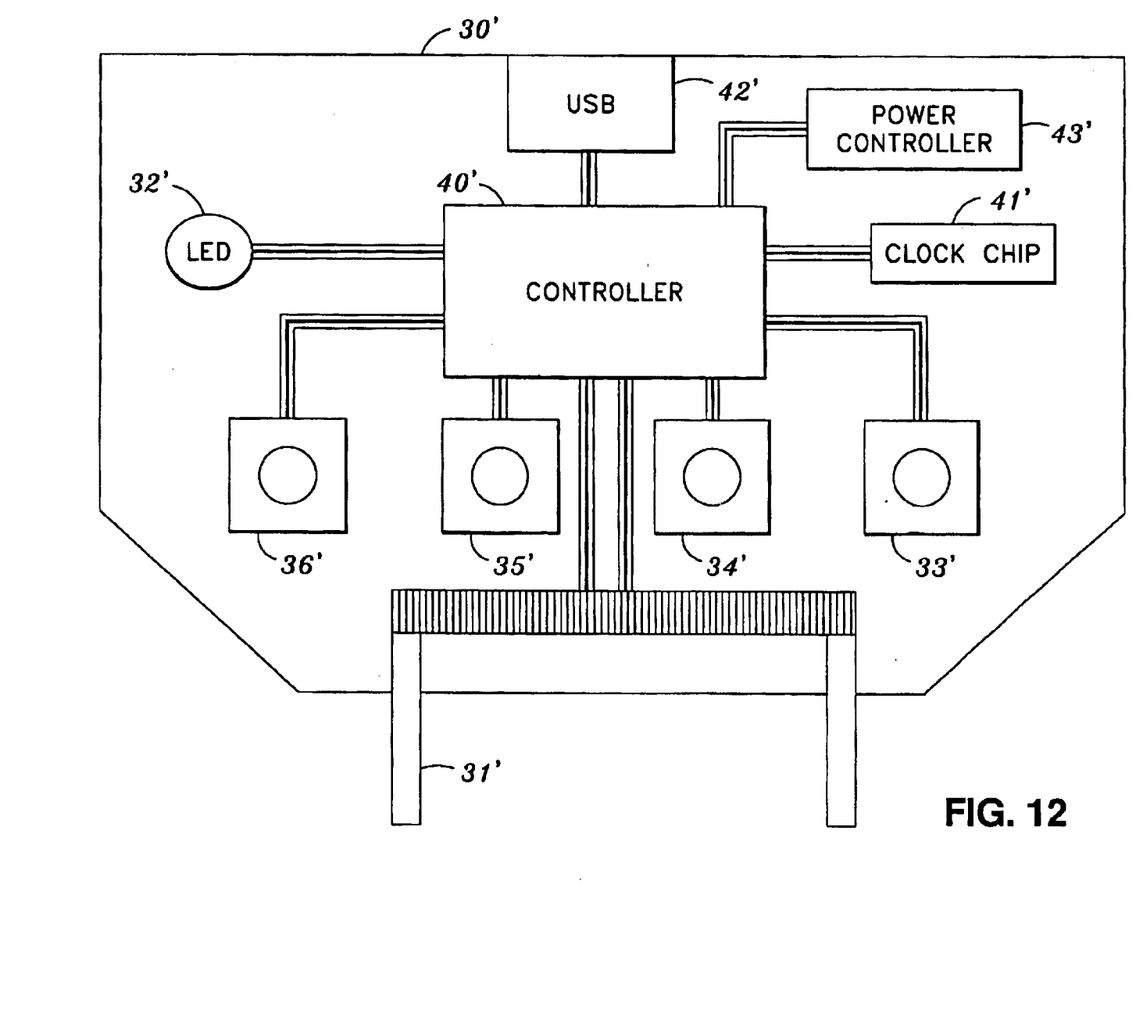
FIG. 12 is a block diagram of an integrated circuit card according to an alternative embodiment of the invention.

FIGS. 10 and 11 depict outward appearances of an alternative embodiment of a media reader 1' according to the invention, and FIG. 12 is a block diagram of an integrated circuit card 25' according to the alternative embodiment. In FIGS. 10 to 12, like components are given like reference numbers corresponding to those described above for FIGS. 5 to 9, but have been designated with a prime. Accordingly, the detailed description given above applies equally for the present embodiment and therefore, will not be repeated here. As seen in FIGS. 10 and 11, media reader 1 is seen to include housing 2', buttons 3', 4', 5' and 6', cable 7', LED 8', and supports 9'. In FIGS. 10 and 11, one difference between the present embodiment of the media reader and the integrated circuit card and the embodiment for each described above is the sequential arrangement of the buttons (and consequently, the switches 33' to 36' on the integrated circuit card 25') which, rather than being arranged sequentially in a vertical direction extending from the media reader 31' to the USB interface 42' (i.e., from front to back), are arranged horizontally (i.e., from side to side). With this embodiment, like the previous embodiment, the media reader is easily manipulated by a user's hand, but provides the ability for the user to easily utilize more than one finger to operate the buttons (if so desired). That is, in the previous embodiment, the buttons are sequentially arranged so that the user can manipulate each of the buttons with, for example, the index finger. However, in the present embodiment, although the user can still easily manipulate each of the buttons with the index finger if so desired, the user can also easily manipulate each of the buttons with more than one finger. For example, the user can manipulate the media reader (for a right handed user) by placing the right hand on the reader, with the user's thumb engaging side 20' of the reader and the user's pinky finger engaging side 21' of the media reader. To manipulate buttons 3' to 6', the user can, for example, easily manipulate button 3' with the index finger, manipulate button 4' with the middle finger, manipulate button 5' with the ring finger, and manipulate button 6' with the pinky finger. Thus, operation of the buttons on the media reader is made easy for the user. Moreover, like the previous embodiment, the size of the media reader 1' is made relatively small so as to be easily manipulated by the user's hand. That is, the media reader 1' according to the present embodiment may be in the range of about 4 to 5 inches in width, 2 to 3 inches in length, and 1 inch in height.

Figure 13:
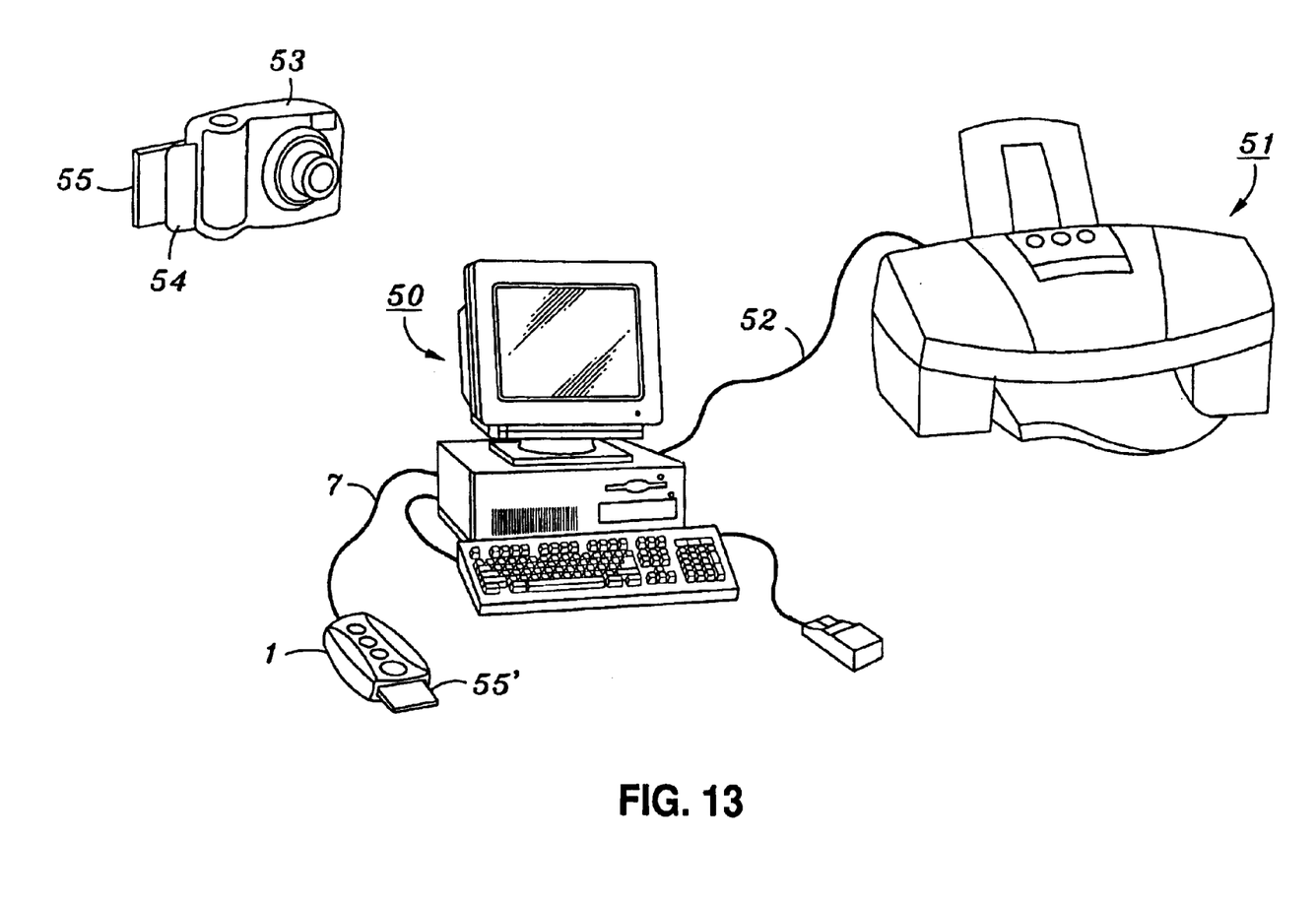
FIG. 13 depicts an example of an environment in which a media reader according to the invention may be employed.

FIG. 13 depicts an example of an environment in which the invention may be employed. As seen in FIG. 13, media reader 1 is connected to personal computer (PC) 50 via USB cable 7, and PC 50 is connected to a printer 51 via bi-directional interface 52. A digital camera 53 includes a removable digital storage medium 55, such as a compact flash memory card, onto which images taken by a user of camera 53 are recorded. The storage medium 55 is removable from camera 53 by, for example, the user simply opening an access door 54 on the camera and removing the medium 55 from the camera. The storage medium may then be inserted into media reader 1, such as medium 55'.

Prior to connecting media reader 1 to PC 50, application software for the media reader is preferably installed on PC 50. The application software provides functionality for the media reader so as to allow a user to perform any of the pre-set functions corresponding to buttons 3 to 6. The application software for the media reader can be installed utilizing conventional software installation techniques, including an installation wizard as is commonly associated with windows operating systems. The application software is preferably invoked by a user depressing one of buttons 3 to 6 and provides printing, indexing, email and saving functionality associated with each of buttons 3 to 6, respectively. That is, when a user inserts a removable digital storage medium into media reader 1 and depresses one of buttons 3 to 6, controller 40 in media reader 1 transmits a signal to PC 50 via USB cable 7 indicating the depression of a button. Depending on which button is depressed, the software either automatically performs the selected function or invokes a user interface on PC 50 for the user to input information to complete the selected function. For example, if the user depressed button 3 corresponding to a "Print"

function, the media reader sends a signal to PC 50 indicating that the "Print" function has been selected. Depending on how the application software is configured, the software either obtains the image data from the digital storage medium, generates a predetermined layout of images, and transmits print data to printer 51, whereby the images are automatically printed out on the printer, or the software may retrieve the images from the digital storage medium and invoke a user interface for the user to input information relating to the layout, printed image quality, etc. Similarly, if the user selects the "Email" function, a user interface may be presented for the user to input an email address and message, with the digital images being retrieved by the application software and attached to the email automatically. The same type of operations apply as well for the "Index" and "Save" functions. In this regard, a directory for storing the image files on PC 50 may be set as a default such that when the user depresses the "Save" button, the application software automatically retrieves the image files from the digital storage medium and saves the files on the PC 50 to the default directory, without the user having to perform any additional operations.

It should be noted that the application software may be invoked prior to the user depressing one of buttons 3 to 6 by, for example, controller 40 in media reader 1 detecting insertion of a digital storage medium into media reader portion 31 and transmitting a signal to PC 50. Upon receiving the signal, the application software may be invoked and operate in, for instance, the background of the operating system, awaiting a signal from the media reader indicating a selected function. This invocation of the application software prior to the user's depression of a button reduces the time needed to complete the selected process since the application program will have already been "pre-started".

As can readily be seen, the foregoing process of the media reader according to the invention significantly simplifies the process of downloading, printing, e-mailing, etc. images stored on a digital storage medium.

The invention has been described with particular illustrative embodiments. It is to be understood that the invention is not limited to the above-described embodiments and that various changes and modifications may be made by those of ordinary skill in the art without departing from the spirit and scope of the invention.

It is claimed:

1. A media reader for a removable digital storage medium, comprising:

a housing having at least a proximal end portion and a distal end portion;

a media reading unit, contained within the housing, into which the removable digital storage medium is inserted for reading data contained thereon, the media reading unit having at least a proximal end adjacent the proximal end of the housing and a distal end opposite the proximal end of the media reading unit, the distal end having a connector for electrically connecting the media reading unit and the removable digital storage medium;

a communication interface that provides communication between the media reader and a peripheral device;

a manual manipulation unit for selecting a predetermined function to be communicated to the peripheral device via the communication interface, the manual manipulation unit being arranged within the housing between the connector of the media reading unit and the distal end portion of the housing, wherein the manual manipulation unit comprises a plurality of buttons each corresponding to a different predetermined function, and each of the plurality of buttons have different sizes based on frequency of use of the predetermined function corresponding to the respective button; and a controller communicating with the connector of the media reading unit, the manual manipulation unit, and the peripheral device via the communication interface, the controller detecting connection of the removable digital storage medium to the connector of the media reading unit, detecting selection of a predetermined function from the manual manipulation unit, and communicating a signal indicative of the selected predetermined function to the peripheral device via the communication interface.

2. The media reader according to claim 1, wherein the media reading unit, the communication interface, the manual manipulation unit and the controller are part of an integrated circuit board installed in the housing.

3. The media reader according to claim 1, wherein the housing further comprises a top portion, wherein each of the plurality of buttons is accessible through a corresponding hole through the top portion of the housing, and wherein the buttons are recessed below an outer surface of the top portion of the housing.

4. The media reader according to claim 1, wherein the media reading unit reads a plurality of different types of removable digital storage media.

5. The media reader according to claim 1, wherein the removable digital storage medium is a medium that stores digital image data recorded thereon by a digital camera.

6. The media reader according to claim 1, wherein the plurality of predetermined functions comprise a print function, an index function, an email function, and save function.

7. The media reader according to claim 1, wherein the plurality of buttons are sequentially arranged in a direction extending from the proximal end of the housing to the distal end of the housing.

8. The media reader according to claim 1, wherein the plurality of buttons are sequentially arranged in a direction transverse to a direction extending from the proximal end of the housing to the distal end of the housing.

9. The media reader according to claim 1, wherein a distance from the proximal end of the housing to the distal end of the housing is in range of 4 to 5 inches.

10. The media reader according to claim 1, wherein a distance from the proximal end of the housing to the distal end of the housing is in range of 2 to 3 inches.

11. The media reader according to claim 1, wherein the signal indicative of the selected predetermined function communicated by the controller to the peripheral device via the communication interface causes an application program in the peripheral device to be automatically commenced to perform the selected predetermined function, the application program in the peripheral device performing the selected predetermined function, including obtaining data from the removable digital storage medium.

12. An integrated circuit card for a media reader for reading a removable digital storage medium, comprising:

a circuit board having at least a proximal end and a distal end opposite the proximal end;

a media reading unit having an electrical connector attached to the circuit board adjacent the proximal end, the removable digital storage medium being inserted into the media reading unit for reading data contained thereon;

a communication interface attached to the circuit board that provides communication between the integrated circuit card and a peripheral device;

a manual manipulation unit attached to the circuit board for selecting a predetermined function to be communicated to the peripheral device via the communication interface, the manual manipulation unit being arranged on the circuit board between the connector of the media reading unit and the distal end portion of the circuit board, wherein the manual manipulation unit comprises a plurality of switches each corresponding to a different predetermined function, and wherein each of the plurality of switches are activated by a corresponding button, each corresponding button having a different size based on frequency of use of the predetermined function corresponding to the respective switch; and a controller attached to the circuit board for communicating with the connector of the media reading unit, the manual manipulation unit, and the peripheral device via the communication interface, the controller detecting connection of the removable digital storage medium to the connector of the media reading unit, detecting selection of a predetermined function from the manual manipulation unit, and communicating a signal indicative of the selected predetermined function to the peripheral device via the communication interface.

13. The integrated circuit card according to claim 12, wherein the media reading unit reads a plurality of different types of removable digital storage media.

14. The integrated circuit card according to claim 12 wherein the plurality of switches are sequentially arranged in a direction extending from the proximal end of the circuit board to the distal end of the circuit board.

15. The integrated circuit card according to claim 12, wherein the plurality of switches are sequentially arranged in a direction transverse to a direction extending from the proximal end of the circuit board to the distal end of the circuit board.

16. The integrated circuit card according to claim 12, wherein the signal indicative of the selected predetermined function communicated by the controller to the peripheral device via the communication interface causes an application program in the peripheral device to be automatically commenced to perform the selected predetermined function, the application program in the peripheral device performing the selected predetermined function, including obtaining data from the removable digital storage medium.

17. A media reader for a removable digital storage medium, comprising:

a housing having at least a proximal end portion and a distal end portion;

a media reading unit, contained within the housing, into which the removable digital storage medium is inserted for reading data contained thereon, the media reading unit having at least a proximal end adjacent the proximal end of the housing and a distal end opposite the proximal end of the media reading unit, the distal end having a connector for electrically connecting the media reading unit and the removable digital storage medium;

a communication interface that provides communication between the media reader and a peripheral device;

a manual manipulation unit for selecting a predetermined function to be communicated to the peripheral device via the communication interface, the manual manipulation unit being arranged within the housing between the connector of the media reading unit and the distal end portion of the housing; and a controller communicating with the connector of the media reading unit, the manual manipulation unit, and the peripheral device via the communication interface, the controller detecting connection of the removable digital storage medium to the connector of the media reading unit, detecting selection of a predetermined function from the manual manipulation unit, and communicating a signal indicative of the selected predetermined function to the peripheral device via the communication interface, wherein the signal indicative of the selected predetermined function communicated by the controller to the peripheral device via the communication interface causes an application program in the peripheral device to be automatically commenced to perform the selected predetermined function, the application program in the peripheral device performing the selected predetermined function, including obtaining data from the removable digital storage medium.

18. An integrated circuit card for a media reader for reading a removable digital storage medium, comprising:

a circuit board having at least a proximal end and a distal end opposite the proximal end;

a media reading unit having an electrical connector attached to the circuit board adjacent the proximal end, the removable digital storage medium being inserted into the media reading unit for reading data contained thereon;

a communication interface attached to the circuit board that provides communication between the integrated circuit card and a peripheral device;

a manual manipulation unit attached to the circuit board for selecting a predetermined function to be communicated to the peripheral device via the communication interface, the manual manipulation unit being arranged on the circuit board between the connector of the media reading unit and the distal end portion of the circuit board; and a controller attached to the circuit board for communicating with the connector of the media reading unit, the manual manipulation unit, and the peripheral device via the communication interface, the controller detecting connection of the removable digital storage medium to the connector of the media reading unit, detecting selection of a predetermined function from the manual manipulation unit, and communicating a signal indicative of the selected predetermined function to the peripheral device via the communication interface, wherein the signal indicative of the selected predetermined function communicated by the controller to the peripheral device via the communication interface causes an application program in the peripheral device to be automatically commenced to perform the selected predetermined function, the application program in the peripheral device performing the selected predetermined function, including obtaining data from the removable digital storage medium.

\* \* \* \* \*

UNITED STATES PATENT AND TRADEMARK OFFICE
CERTIFICATE OF CORRECTION

PATENT NO. : 6,955,292 B2 Page 1 of 1
APPLICATION NO. : 10/188423
DATED : October 18, 2005
INVENTOR(S) : Fumiharu Nakamura et al.

It is certified that error appears in the above-identified patent and that said Letters Patent is hereby corrected as shown below:

On the Title page, Item (73), Assignee: "Canon Kabushiki Kaisha, Tokyo (JP)" should read --Canon U.S.A. Inc., Lake Success, New York--.

Signed and Sealed this

Sixteenth Day of December, 2008

JON W. DUDAS
*Director of the United States Patent and Trademark Office*